Feb. 5, 1946.　　H. H. SNYDER ET AL　　2,394,116
PRODUCTION OF REFLECTORS
Filed April 30, 1942　　2 Sheets-Sheet 1
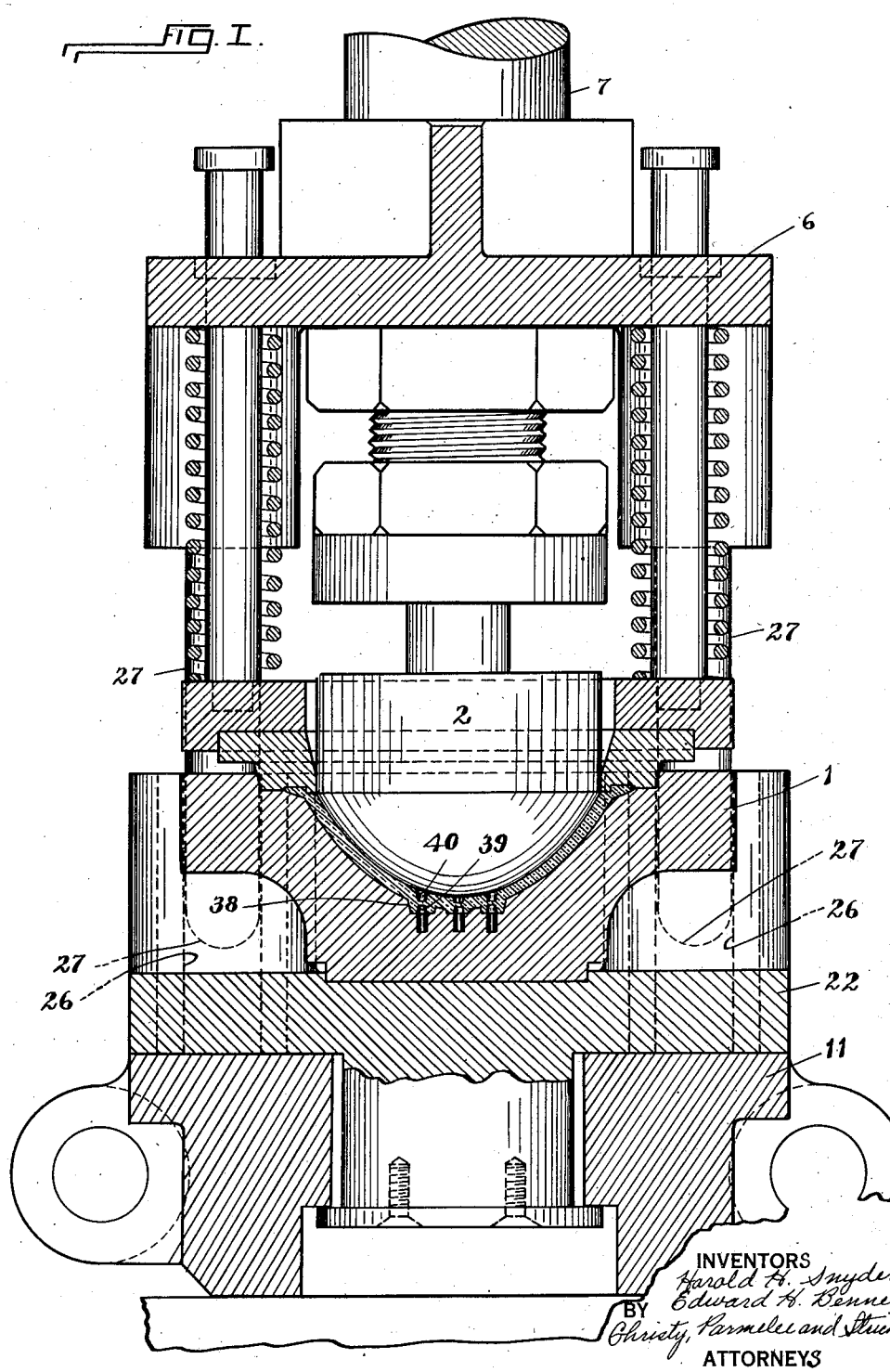
INVENTORS
Harold H. Snyder
Edward H. Bennett
BY Christy, Parmelee and Strickland
ATTORNEYS Feb. 5, 1946.   H. H. SNYDER ET AL   2,394,116
PRODUCTION OF REFLECTORS
Filed April 30, 1942   2 Sheets-Sheet 2
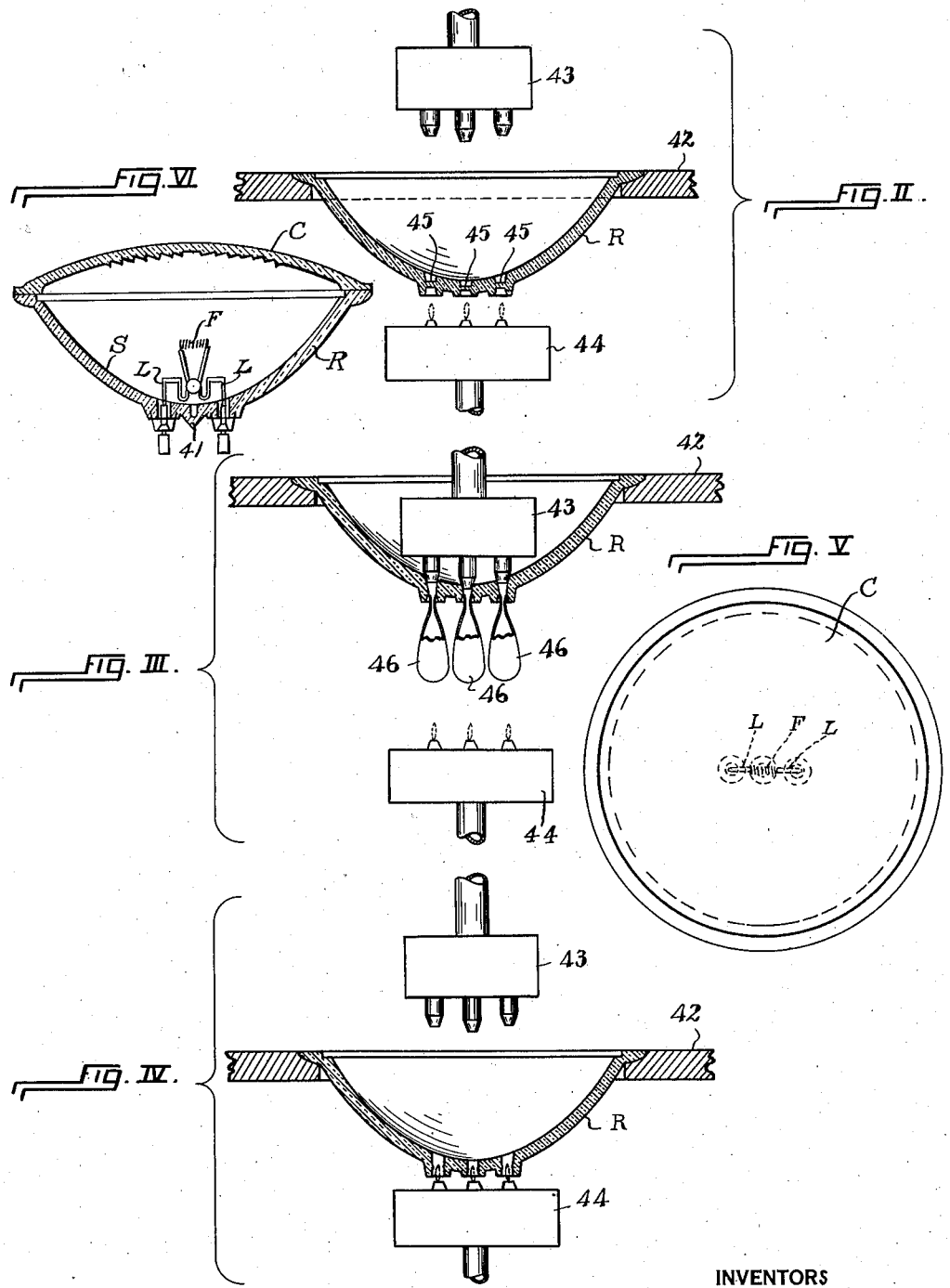

Patented Feb. 5, 1946

2,394,116

UNITED STATES PATENT OFFICE 2,394,116

PRODUCTION OF REFLECTORS

Harold H. Snyder, Mount Lebanon, and Edward H. Bennett, Pittsburgh, Pa., assignors to Forter-Teichmann Company, Pittsburgh, Pa., a corporation of Pennsylvania Application April 30, 1942, Serial No. 441,110

3 Claims. (Cl. 49—79)

This invention relates to the production of reflectors for lamps such as are commonly used as headlights for automobiles. The objects in view are the production of reflectors of highest degree of accuracy in form, with consequent maximum efficiency, and the employment of instruments and methods such as to admit of production with speed and economy.

In the accompanying drawings Fig. I is a view in vertical section of a machine for pressing the blanks from which reflectors of the invention are made; Figs. II, III, and IV are diagrammatic views in section, that illustrate further operation upon the blanks that are produced in the machine of Fig. I; and Figs. V and VI are views in front elevation and in axial section of the finished lamp.

The machine that is illustrated in Fig. I is the subject of a companion application to this, filed April 30, 1942, Serial No. 441,111. The machine includes a bowl-shaped mold member 1 and a convex plunger member 2, and these two members close, the plunger within mold member 1, to shape a gob of glass previously deposited in mold member 1 to the blank for the reflector of the lamp. The mold member 1 is carried by a block 22, and block 22 in turn is mounted upon a plate 11 that forms part of an endless chain conveyor. The mounting of the block upon the plate of the conveyor is such as to allow the block and with it the mold member 1 to be adjusted transversely upon the plate 11. The plunger member 2 is reciprocated by a piston within a fluid-pressure cylinder. The piston stem shown in Fig. I bears the reference numeral 7. The cross-head 6 of the press bears downwardly extending stems 27, and the block 22 that carries the mold part 1 is provided with bores 26. The stems 27, entering the bores 26 as the press closes, insure the accurate axial alignment of the parts 1 and 2 as they close upon the gob of glass to shape it to the blank for the reflector.

This blank is of paraboloid form. The surface of the plunger 2 is chromium plated and highly polished, and the inner surface of the blank that is shaped upon the face of plunger 2 is correspondingly smooth. It is this surface that is silvered, to become the reflecting surface of the lamp.

The blank is shaped to general paraboloid form. Additionally, it is penetrated at and near the axis of the paraboloid with orifices. The forming of these orifices is begun in the press shown in Fig. I and is completed by the means and in the manner illustrated in Figs. II–IV, and it is in the formation of these orifices that the invention resides for which I here seek Letters Patent. Referring first to Figs. V and VI, it will be seen that the reflector R is penetrated by three orifices: one of them centered in the axis of the paraboloid; the other two symmetrically placed adjacent to and on opposite sides of the axis. The central orifice is provided for the evacuation of the assembled lamp, and, when evacuation has been effected, is sealed off in known manner, and as indicated at 41, Fig. VI. The other two orifices are designed to receive leads L, L that are seated in these orifices in hermetically tight union. These leads afford support for the filament F that, arranged at the focus of the paraboloid, constitutes the light source of the lamp; and the leads carry the electric current that brings the filament F to incandescence. The number and grouping of the orifices here shown is exemplary, merely; the invention is not limited in these particulars.

Referring again to Fig. I, it will be seen that the continuity of the curved surface of the mold member 1 is interrupted by downwardly tapering circular recesses 38, that within these recesses rise projections 39 of conical frustum shape, and that from the curved face of plunger 2 projections 40 of conical frustum shape project downwardly. The projections 39 and 40 stand opposed in pairs. These opposed projections form in the molded blank aligned circular recesses or pits whose bottoms are separated by thin septa of glass.

The next step in procedure is to remove these septa with accuracy, speed and economy. This further procedure is illustrated in Figs. II–IV. The article R, as it comes from the press, having been allowed to cool and harden, is placed in a suitable support 42. With the so supported article are arranged a blowpipe 43 and a burner 44, and these parts are brought into conjoint and successive operation. The parts being in the position shown in Fig. II, the flames from the burner 44, concentrated upon the septa 45 that divide the aligned recesses of the three pairs, soften the substance of those septa. The blowpipe 43 then is lowered to the position shown in Fig. III; and (the burner 44 being withdrawn) streams of compressed air, delivered through the blowpipe, blow the softened glass of the septa to bubbles 46; and the flow of air is continued until these bubbles burst like soap-bubbles, and the attenuated glass breaks freely away. The blowpipe then is withdrawn, and the burner 44 is advanced until the flames actually enter the now completed perforations (as shown in Fig. IV). The heat of the flames is effective to give uniformity of surface and fire polish to the inner walls of the perforations. And all this is done with accuracy in the position and proportions of the orifices.

The blank R with the orifices so finished is silvered over its inner surface S (Fig. VI); leads L, L are introduced into the lateral orifices and union with the walls of the orifices is made hermetically tight; the filament F is mounted upon the leads; the cover glass or "lens" C is applied, resting at its rim upon the rim of the reflector R; the seam is made hermetically tight, advantageously by softening and welding the glass at the meeting surfaces; the closed lamp is then evacuated of air by means of an air pump connected to the central orifice; and, finally, the central orifice is sealed, as indicated at 41.

We claim as our invention:

1. The method herein described of forming an accurately positioned and accurately proportioned orifice in the wall of a pressed glass article which consists in forming in the opposite surfaces of the article between opposed projections in the mold walls aligned recesses whose bottoms are separated by a septum of less thickness than the wall throughout the remainder of its extent, allowing the pressed article to harden, softening again the septum alone, and blowing its softened substance to a bubble and continuing the blowing until the glass of the bubble breaks away from the adjacent portion of the article, and finally fire-polishing the interior of the orifice so formed.

2. The method herein described of forming an accurately positioned and accurately proportioned orifice in the wall of a pressed glass article which comprises forming in the opposite surfaces of the article between opposed projections in the mold walls aligned recesses whose bottoms are separated by a septum of less thickness than the adjacent wall of the article, allowing the pressed article to harden, softening again the septum alone, and blowing its softened substance to a bubble and continuing the blowing until the glass of the bubble breaks away from the adjacent portion of the article, and smoothing the scarred surface within the bore thus formed.

3. The method herein described of forming a relatively thin pressed glass wall through which an electric conductor is to extend in sealed union with the wall, said method comprising molding on at least one of the opposite surfaces of said wall a projection and forming within the opposite surface of the wall and within the body of said projection aligned recesses whose bottoms are separated by a septum of glass which is of predetermined thickness and substantially thinner than the adjacent wall of glass, and subsequently removing the septum to provide a passage for said conductor while said projection provides for the sealing of the conductor to the wall, substantially as described.

HAROLD H. SNYDER.
EDWARD H. BENNETT.